Oct. 21, 1958 G. A. LYON 2,857,208
AIR COOLED WHEEL STRUCTURE
Filed Feb. 19, 1954
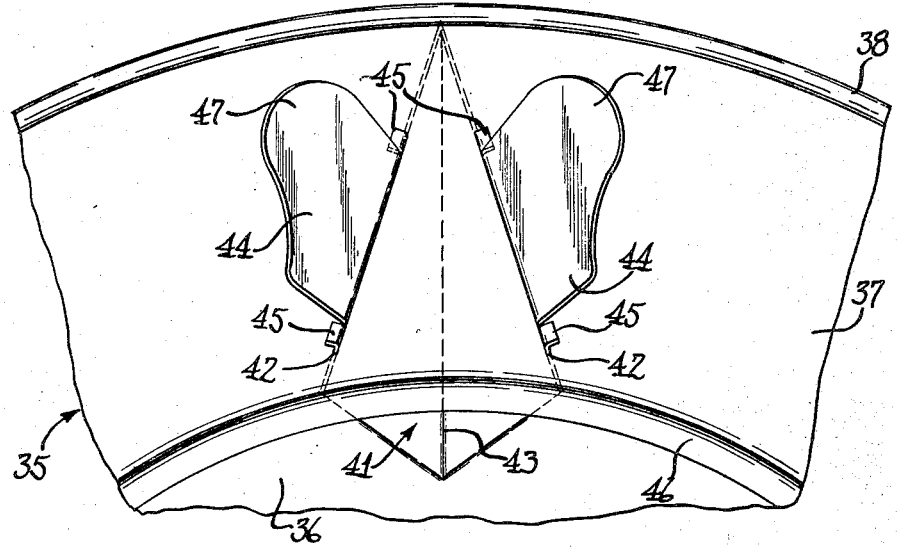
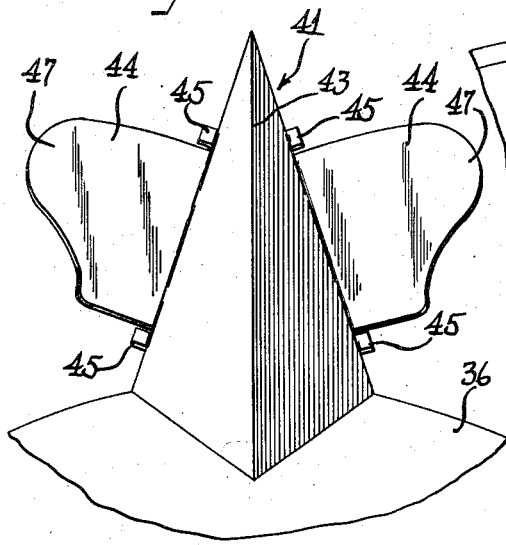
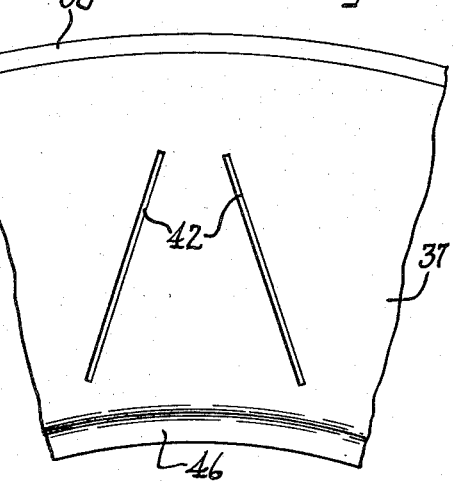
George Albert Lyon

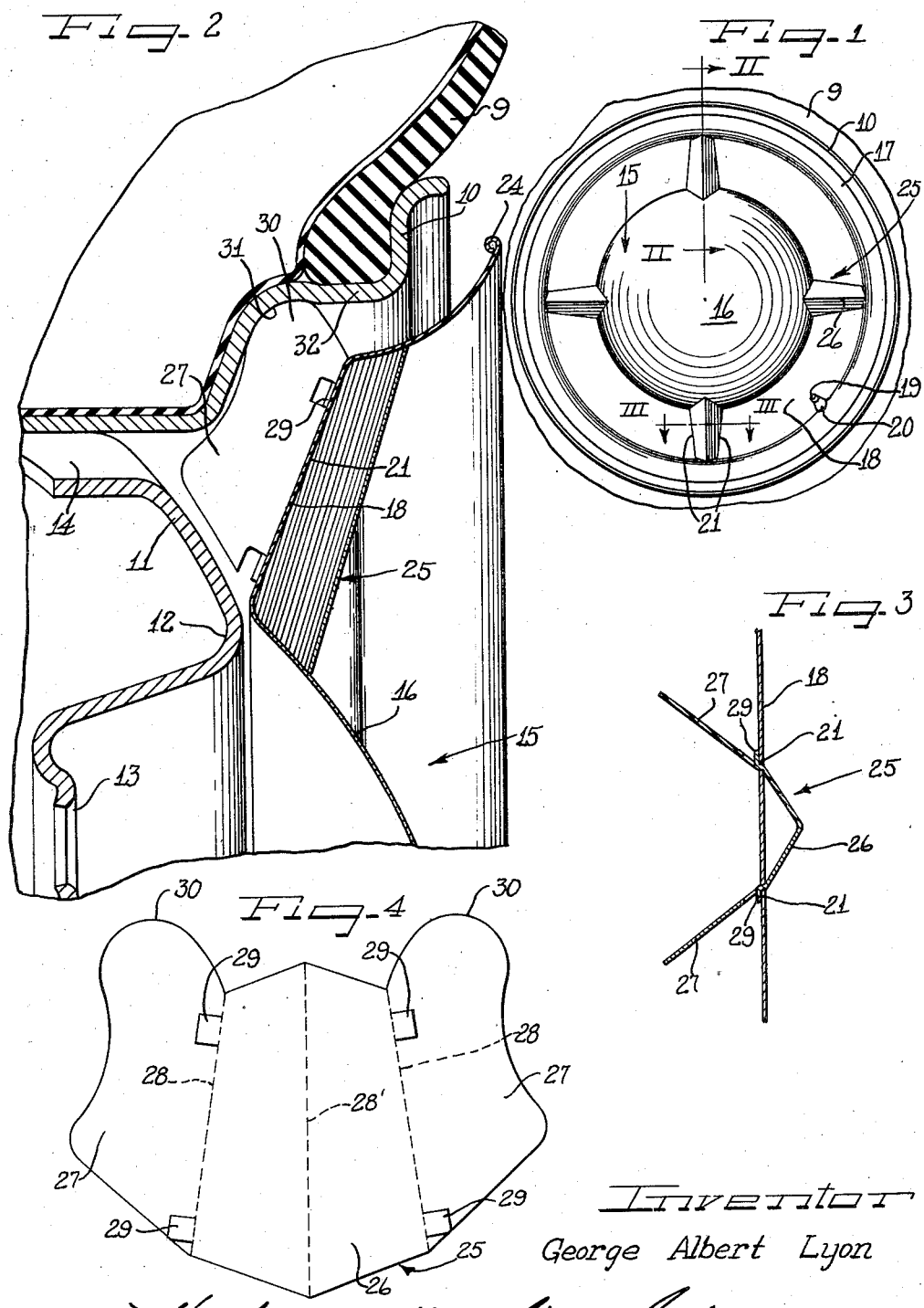

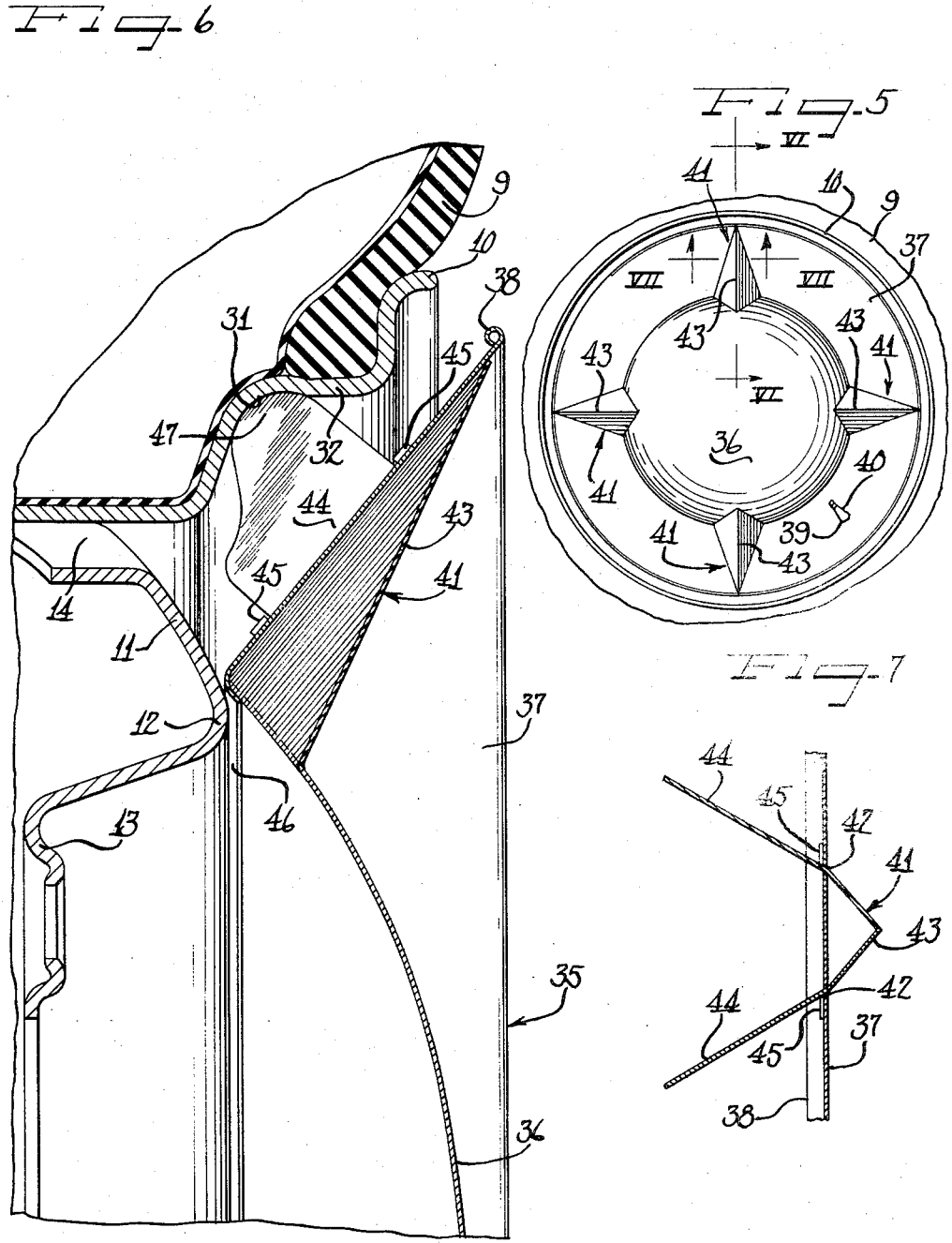

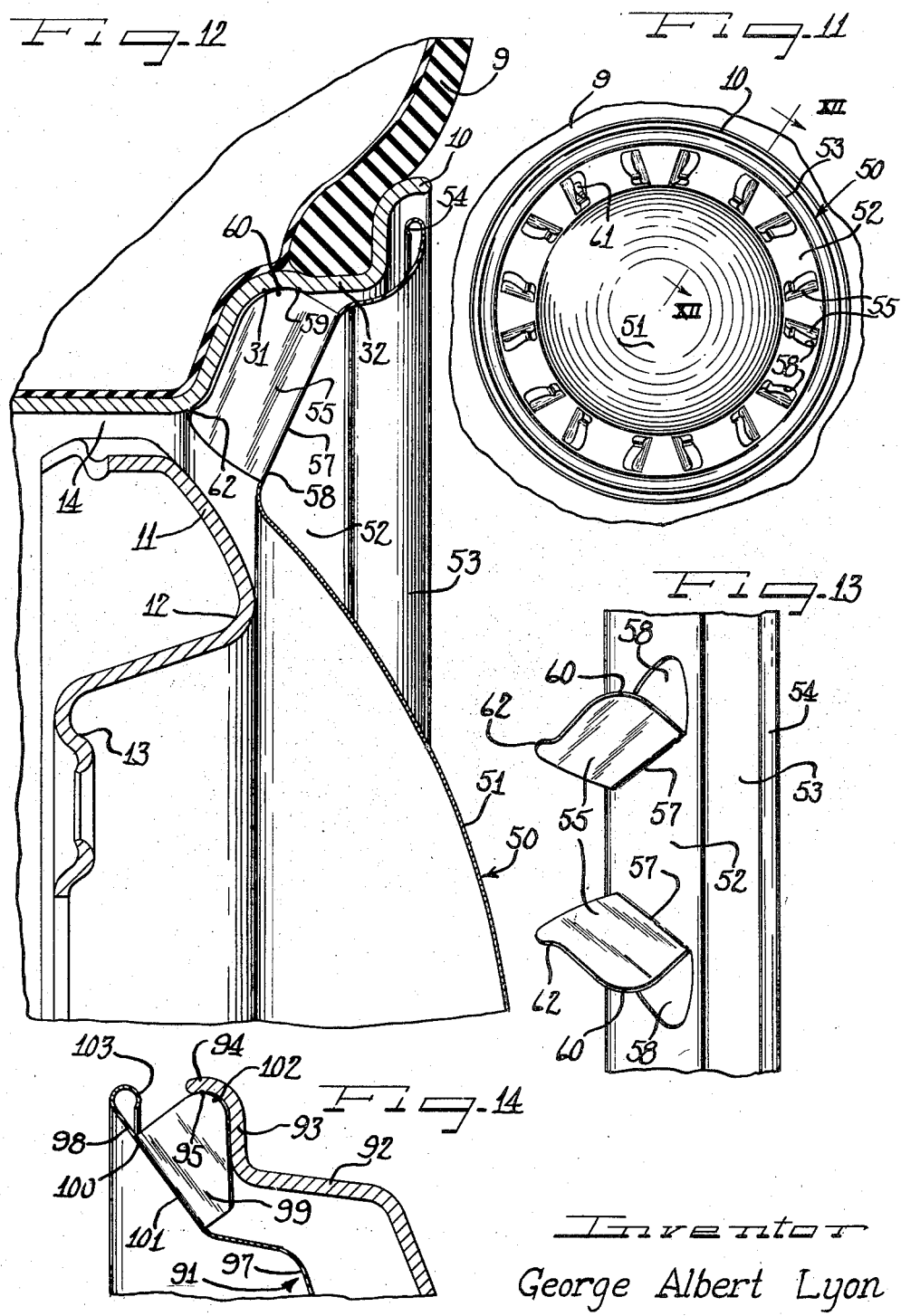

Oct. 21, 1958 G. A. LYON 2,857,208
AIR COOLED WHEEL STRUCTURE
Filed Feb. 19, 1954 7 Sheets-Sheet 5
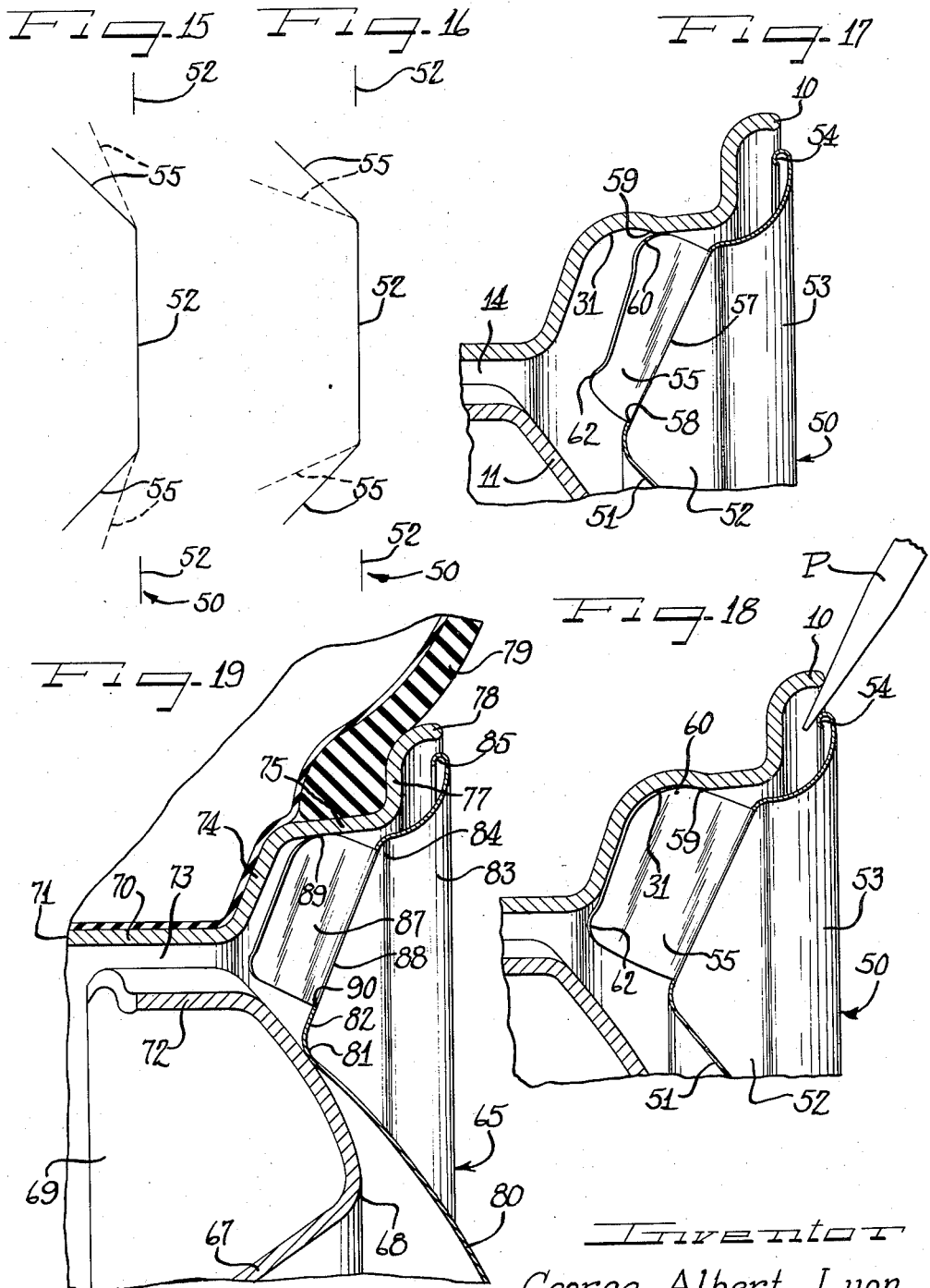
Inventor
George Albert Lyon

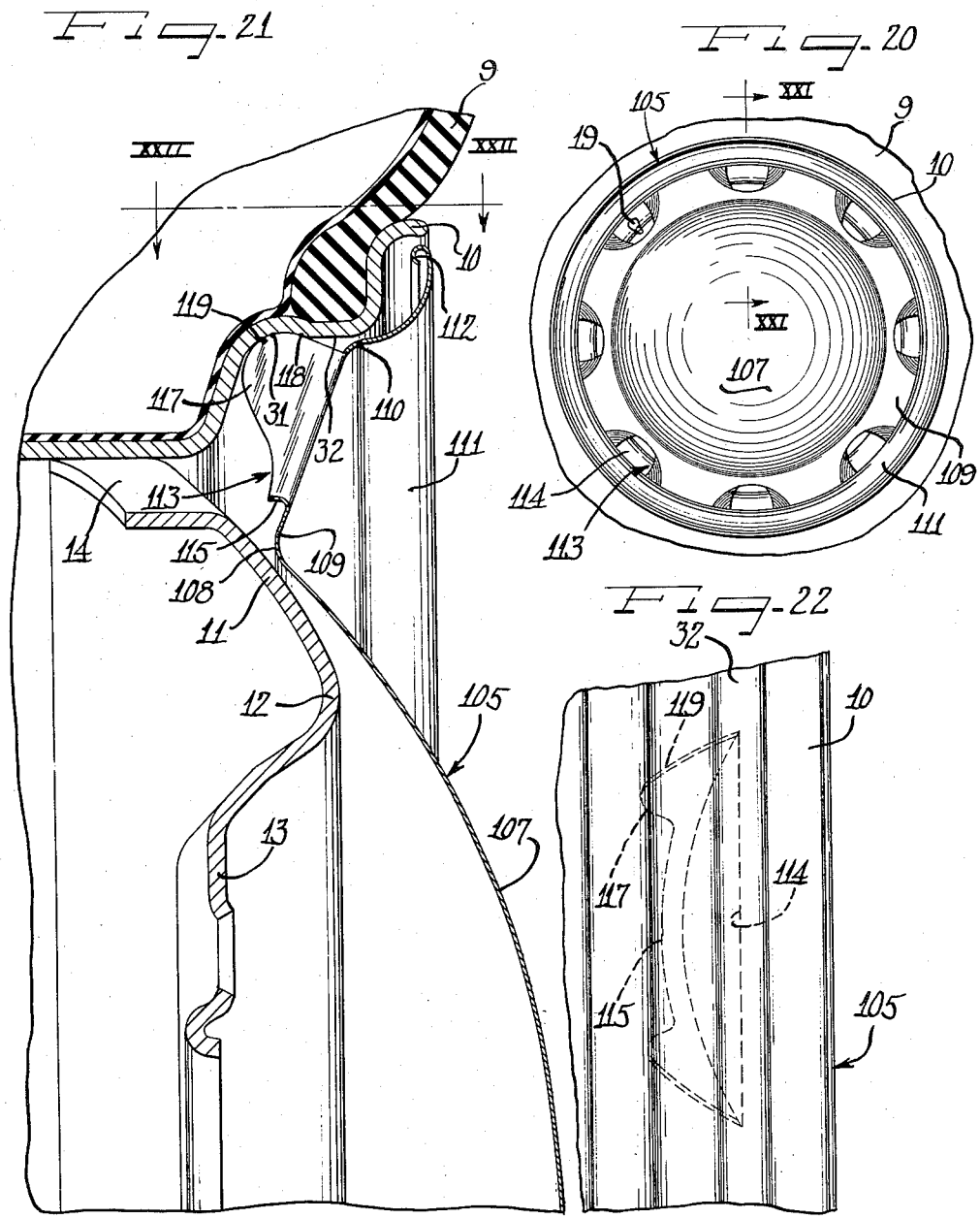

Oct. 21, 1958   G. A. LYON   2,857,208
AIR COOLED WHEEL STRUCTURE
Filed Feb. 19, 1954   7 Sheets-Sheet 7
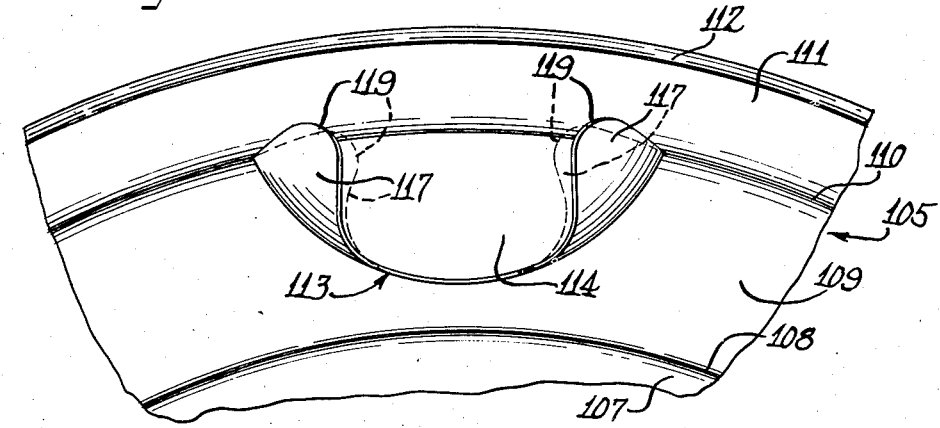
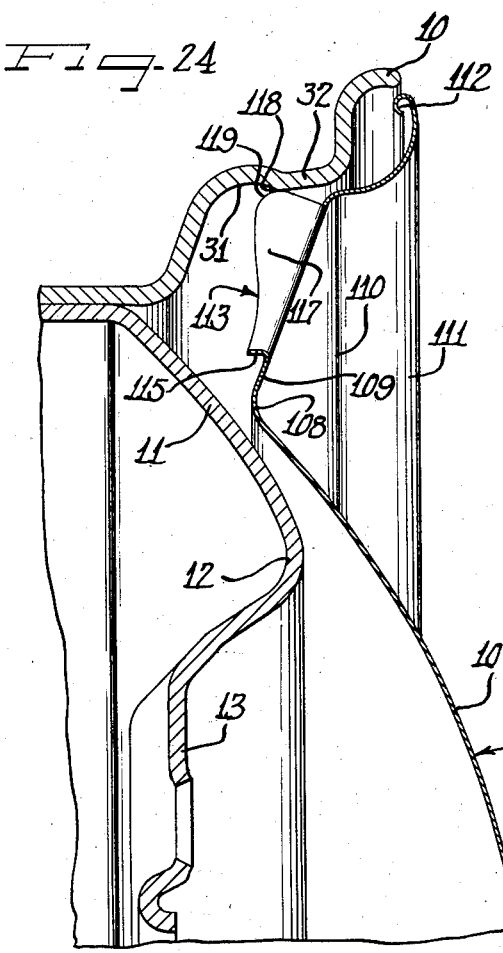
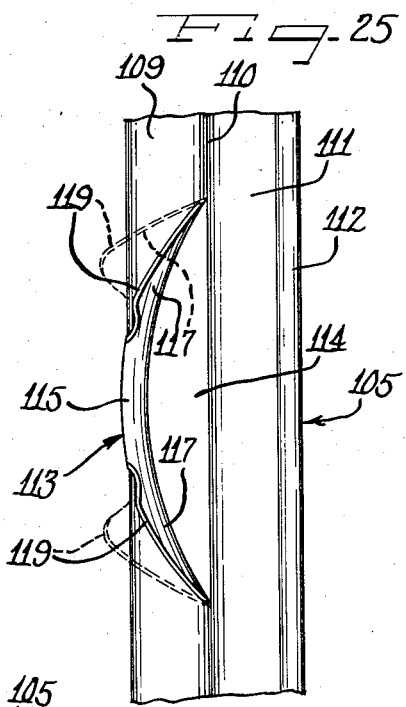
Inventor
George Albert Lyon United States Patent Office
2,857,208
Patented Oct. 21, 1958

2,857,208

AIR COOLED WHEEL STRUCTURE

George Albert Lyon, Detroit, Mich.

Application February 19, 1954, Serial No. 411,436

7 Claims. (Cl. 301—37)

The subject matter of the present application has been carved from my copending applications Serial Nos. 259,546, filed December 3, 1951; 259,793, filed December 4, 1951; 269,394, filed February 1, 1952, and 269,395, filed February 1, 1952, all now abandoned.

This invention relates to improvements in wheel structures and more particularly concerns the ornamental and protective covering of the outer sides of automobile wheels in such a manner that circulation of air through the wheel during rotation thereof is enhanced.

An object of the present invention is to provide a wheel cover with novel retaining means which can serve the additional function of also acting as vanes and providing the cover on its outer side with a spoke-simulating arrangement for enhancing the appearance of the cover.

Another object of this invention is to provide in a wheel structure a wheel cover comprising a simple device serving four purposes, namely, that of holding a plurality of cover parts together, of providing a spoke-simulating section at the outer side of the cover, of providing air-circulating vanes at the inner side of the cover and of providing cover-retaining means for resiliently detachable snap-on pry-off engagement with the wheel member.

A further object of the invention is to provide a vehicle wheel structure to which is applied an ornamental and protective wheel cover having novel self-retaining means interengaging in a novel manner with the wheel.

Still another object of the invention is to provide an improved wheel cover having wing-like retaining fingers with projecting edges for retaining engagement with a flange of a wheel.

Yet another object of the invention is to provide an improved wheel cover which is self-retaining on a vehicle wheel in a cushioned, substantially floating relationship.

A still further object of the invention is to provide a vehicle wheel cover having improved means for self-retention of the cover on the wheel and possessed of efficient easy-on, hard-off characteristics.

Other objects, features and advantages of the present invention will be readily apparent from the following detailed description of certain preferred embodiments thereof taken in conjunction with the accompanying drawings, in which:

Figure 1 is a side elevational view of a wheel having thereon a cover embodying features of the invention;

Figure 2 is an enlarged fragmentary radial sectional view taken on substantially the line II—II of Figure 1;

Figure 3 is an enlarged fragmentary sectional detail view taken substantially on the line III—III of Figure 2;

Figure 4 is an elevational view of one of the wing and spoke elements for use on the cover of Figures 1 and 2, showing the spoke element in flat or developed form being bent along the dotted fold lines;

Figure 5 is an outside elevational view of a wheel structure embodying a modified form of the cover embodying features of the invention;

Figure 6 is a fragmentary enlarged radial sectional view taken substantially on the line VI—VI of Figure 5;

Figure 7 is a fragmentary enlarged sectional detail view taken substantially on the line VII—VII of Figure 5;

Figure 8 is a fragmentary rear elevational view of the cover of Figure 6 showing details of structure of the vaned cover retaining and air circulation promoting element on the rear side of a portion of the cover;

Figure 9 is a fragmentary outer side elevational view of one of the vaned elements of the inner of the cover members showing how it radiates from such cover element, with the outer annular cover part omitted;

Figure 10 is a fragmentary side view of a portion of the outer annular cover part prior to the application of the winged elements of the inner cover part thereto, and showing the diagonal and converging slots that are adapted to receive a set of wings or vanes of one of the vane elements;

Figure 11 is an outer side elevational view of a wheel structure showing a further modification of the invention;

Figure 12 is a fragmentary enlarged radial sectional view taken substantially on the line XII—XII of Figure 11;

Figure 13 is a fragmentary edge elevational view of the cover showing two of the cover retaining and air circulation promoting vanes thereof;

Figure 14 is a fragmentary radial sectional detail view through a wheel structure showing a modification of the cover of Figure 12;

Figure 15 is a schematic view illustrating the action of the retaining wing tabs of the cover of Figures 12 or 14 specifically, but applicable to the action of the tabs of the covers of Figures 2 and 6 as well, during application of the cover to a wheel;

Figure 16 is a schematic view similar to Figure 15 but showing the action of the retaining wing tabs during pry-off;

Figure 17 is a sectional detail view similar to Figure 12 but showing substantially the relationship of the retaining wing tabs of the cover during application of the cover to the wheel;

Figure 18 is a sectional detail view similar to Figure 17 but showing the relationship of the retaining wing tabs to the cover and the wheel during pry-off;

Figure 19 is a radial sectional view similar to Figure 12 but showing still another modification;

Figure 20 is a side elevational view of a vehicle wheel showing still another modification;

Figure 21 is a fragmentary radial sectional detail view taken substantially on the line XXI—XXI of Figure 20;

Figure 22 is a fragmentary peripheral plan view of the tire rim in Figure 21 showing the cooperation of the retaining means of the cover with the tire rim and taken substantially along the line XXII—XXII of Figure 21, but with the tire and tube assembly removed from the rim;

Figure 23 is a fragmentary rear elevational view of the cover of Figure 21 showing one of the pairs of retaining wing tabs thereof;

Figure 24 is a sectional view similar to Figure 21 but showing the cover and process of being applied; and Figure 25 is an edge elevational view of the cover showing the retaining ear fins or wings as they react during application of the cover to the wheel.

The cover of my invention is adapted for use with a conventional wheel which is shown in Figure 2. This wheel includes the usual pneumatic tire and tube assembly 9 mounted in the customary way upon a multi-flanged drop center tire rim 10. The tire rim is attached at a plurality of points to a wheel body member 11 having transverse wheel openings 14 alternating with the points of its attachment to the rim in a manner well known in the art. The central body member 11 comprises a dished stamping and includes an annular nose or bulged portion 12 leading into a central bolt-on flange 13 adapted to be detachably secured as by means of cap screws or bolts (not shown) to a brake drum (not shown) or the like on the axle of a vehicle.

In Figure 2 I have shown my novel wheel cover, designated generally by the reference character 15 in cooperation with this wheel. The cover 15 includes divergent central and outer portions 16 and 17 connected by a junction portion 18 which comprises an indentation in the cover. The cover 15 proper may be made as a metallic stamping from sheet steel stock. I have obtained excellent results by using stainless steel sheet or coil stock by reason of the fact that stainless steel possesses resiliency and lends itself admirably to high lustrous finishes.

In order to accommodate a valve stem 19, the portion 18 of the cover may be provided with a hole 20 (Figure 1) through which the free end of the valve stem 19 can project in the usual way; it, of course, being well known in the art that the tire and tube assembly 9 is provided with such a valve stem and the same must be accessible for introducing air into the assembly.

The portion 18 of the cover (Figure 3) is provided with a series of pairs of diagonal slots 21—21 which in this case comprise four pairs of such slots due to the fact that I contemplate using four spoke elements with the cover. These slots 21—21 extend generally radially for a purpose which will now be described.

Associated with each pair of the slots 21—21 is a spoke element 25. This element 25 is shown in elevation in Figure 4 and may be made from the same material that the cover 15 is made from. Actually, I contemplate making the four elements 25—25 from scrap stock such as that which is left over from the corners of a blank from which the cover 15 proper is stamped.

The spoke element 25 on the outer side of the cover has an angular spoke-simulating section 26 designed to extend generally radially from the central crown portion 16 of the cover. This angular portion or section 26 terminates in divergent ears, fins, tabs, wings or vanes 27—27 adapted to project through the slots 21—21 of the cover portion 18. It will be appreciated that in addition to being divergent these wings 27—27 also extend diagonally in a direction generally radially of the cover (Figure 1).

In Figure 4 I have shown one of the elements 25 in flat form and have designated by dotted lines 28 the lines of bend on which the wings 27 are bent with reference to the central spoke section 26. I have also shown by dotted line 28' the line of central bend of the section 26 and along which the middle of the section is bent to form it into the angular cross section shown in Figure 3.

The wings 27—27 have punched or depressed from them lateral tangs or tabs 29—29 which, as shown in Figure 4, comprise two pairs, one pair on each side of the angular spoke section 26.

These tangs or tabs 29 are adapted to be bent over the inner surface of the cover portion 18 as shown in Figure 3 and when thus bent interlock the element 25 firmly to the cover with the spoke section 26 in tight engagement at its complementally formed ends with both of the central and outer cover portions 16 and 17, respectively (Figure 2).

Each of the wings or vanes 27 has a curved radially outwardly projecting extremity having a resiliently flexible edge portion 30 adapted to snugly nest in an annular groove 31 in the intermediate or bead flange 32 of the rim. This groove, as is well known in the art, serves the present purpose of assisting in holding the tire bead in place on the flange 32.

It should also be noted that if it is so desired the cover may be provided with an outer turned finishing edge 24 for rigidifying the edge and for preventing anyone from cutting his or her hands on the same.

In the application of the cover 5 to the wheel the valve stem hole 19 is first aligned with the stem and then the cover is pressed axially toward the body of the wheel, which results in the curved wing edge radial tip portions 30 cammingly engaging the flange 32. Due to the fact that the curved flexible wing portions 30 are disposed in a circle of a diameter greater than that of the inner surface of flange 32, the wings 27 must yield as the cover is pressed into the wheel. Also, by reason of the fact that the wings 27—27 as shown in Figure 3 are divergent, they will tend to spread apart upon engaging the rim flange 32, thus placing them under tension and upon the wings reaching the groove 31 these wings will move toward each other under tension and into tensioned cover gripping engagement with the bottom of the groove 31 and behind the axially outer shoulder defining the groove.

I also desire to call attention to the fact that since the wings 27 are in tensioned engagement with the surface of the rim in the groove 31 when the cover is on the wheel and by reason of the angularity of the wings 27, any tendency of the cover becoming accidentally dislodged will be resisted.

Moreover, due to the fact that the wings 27 extend generally radially of the wheel in the space separating the cover from the tire rim, they will assist, upon rotation of the wheel, in the circulation of air through the wheel openings 14 and through the gap between the cover and the rim.

Removal of the cover 15 may be easily effected by inserting a suitable pry-off tool under the reinforced turned edge 24 of the cover and by forcibly ejecting the cover from its engagement with the wheel. This is possible due to the fact that the wings 27 are resilient and can be deflected without taking a permanent set.

In the modification of Figures 5 through 10, another form of the invention providing an interconnected spoke-vane arrangement is disclosed. Inasmuch as the wheel shown in Figures 5 and 6 is identical with the wheel of Figures 1 and 2, identical reference numerals have been applied to designate identical parts of the wheel.

According to this form of the invention, a novel multi-part metallic sheet wheel cover 35 is provided including a central circular crown part 36 and a radially outer annular part 37 terminating in a turned or rolled cover pry-off edge 38 which, when the cover is on the wheel, is spaced from the tire rim 10. This outer annular portion 37 (Figure 5) has a hole 39 through which the free end of the usual valve stem 40, emanating from the tire and tube assembly 9, projects so as to be accessible from the exterior of the cover.

The central cover part or portion 36 has projecting from it, as best shown in Figure 5, four identical elements or devices each of which is designated generally by the reference character 41. These four elements which are vaned as shall be described hereinafter, project from four corners of the periphery of the circular part 36 and are integral with the peripheral margin of the cover part 36. Also, in the process of stamping the cover part 36 from metallic sheet or coil stock, the scrap which would be left at the corners of the circular part or stamping is utilized to form the elements 41. In practice the circular part 36 is stamped with the elements 41 likewise stamped from the sheet, only the elements could be formed in the flat and later shaped by suitable press operations to the construction shown best in Figure 9. Before proceeding with a detailed description of the elements 44, it should be noted that the other cover part 37 (Figure 10) is provided with four pairs of spaced diagonal or converging slots 42—42 which extend generally in a radial direction and are adapted to have portions of the element 41 inserted therethrough from the outer side of the cover to the inner side of the cover.

Each of the elements 41 includes a transversely angular outer pointed portion 43 which extends generally radially from the peripheral margin of the central cover part 36 and in reality simulates a spoke. This spoke is intended to overlie the outer side of the annular cover part 37 as best shown in Figures 6 and 7.

Projecting from the rear edges of the spoke sections or portions 43 are divergent spaced tabs, ears, fins, wings or vanes 44—44 which, in the assembly of the cover, are adapted to be inserted through a pair of the diagonal slots 42—42 in the cover part 36.

Also projecting from the rear edges of the spoke sections 43 are two pairs of tangs or tabs 45—45, likewise insertable through the slots 42—42 and adapted to be bent under the rear side of the outer cover part 36 as best shown in Figure 7. Any suitable equipment may be employed for striking down the tabs or tangs against the rear surface of cover part 37. After this fastening operation it will be appreciated that the spoke sections 43 will bear against the exposed or outer surface of cover part 37, and the tangs or tabs 45 will bear against the inner surface, thus firmly interlocking each of the elements 41 to the cover part 37.

The outer annular cover part 37 has a turned inner edge 46 wrapped around and behind the rear edge and side of the central cover part 36. In other words, the two cover parts are in nested concentric engagement and are held tightly in this engagement by the interlocking of the elements 41 thereto which, as noted before, are integral with the central cover part 36.

The cover part 36 may be made from any suitable steel sheet stock although I have attained excellent results by making the same out of stainless steel due to the resiliency of such steel. I utilize this resiliency in the wings or vanes 44 which are provided with curved radially outwardly projecting extremity having resiliently flexible edge portions 47 intended to have snap-on resilient engagement within the annular groove 31 in the intermediate transverse flange 32 of the tire rim 10 (Figure 6).

In the application of the cover 35 to the wheel, the hole 39 (Figure 5) is first aligned with the valve stem 40 and then the cover is pressed axially inwardly, thus resulting in the wing edge portions 47 cammingly engaging the rim flange 32. Due to the resiliency of the vanes or wings 44, as well as the fact that in each element they diverge from each other, they will move apart until the edge portions 47 reach the groove 31 at which time they will snap into the groove under tension (Figure 6). That is to say, the terminal edge portions 47 of all of the wings 44 are disposed in a circle of a larger diameter than that of the inner surface of the flange 32 and, hence, the wings have to yield as they are cammingly pressed over the surface of the flange and until they reach the groove 31. When the rounded edge portions 47 reach the groove 31, the wings 44, which have been resiliently deflected, will move toward each other as they snap into the groove and behind the axially outer shoulder defining the groove.

It is also to be understood that since the wings 44 extend generally radially in the space separating the cover part 37 from the tire rim 10, they will, in the rotation of the wheel, serve as air vanes for the purpose of fanning air and augmenting the circulation of air through the wheel openings 14 and through the space maintained by the retaining wings between the cover and the tire rim.

When it is desired to remove the cover 35 from the wheel, a suitable pry-off tool may be inserted behind the turned reinforced cover edge 38, and by applying through the tool an ejecting force to the cover at least one set of the wings 44—44 will be released from the groove 31 and the cover may then be easily lifted from the wheel.

On the other hand, due to the fact that the wings 44 are in resilient tensioned engagement with the bottom of the groove 31 when the cover is on the wheel as well as due to the angle of these wings, they will tend to resist accidental displacement from the wheel.

Many different pleasing ornamental effects may be obtained with this construction since the cover parts 36 and 37 may have contrasting finishes and likewise the external surfaces of the spoke sections 41 can be finished in such a way as to stand out against the cover proper.

Having reference to the modification of Figures 11, 12, 13, 15, 16, 17 and 18, the invention is embodied in a wheel cover 50 applicable to a vehicle wheel which is substantially the same as that shown in Figures 2 and 6 and accordingly similar reference numerals have been applied to indicate identical parts of the wheel.

Although it will be appreciated that the cover 50 may be in the form of a trim ring the primary function of which would be to cover the outer side of the tire rim 10 and the adjacent portion of the wheel body 11, a desirable, economical one piece, full disk type of cover is shown comprising a circular body which is of a magnitude and extent to substantially entirely cover the outer side of the wheel including the tire rim and the wheel body. For this purpose, the cover 50 comprises a central crown portion 51 which lies over the central portion of the wheel body including the bolt-on flange 13 and affords a substantial space or chamber between the bolt-on flange and the crown of the cover to accommodate the axial hub with which the wheel may be associated in service. Radially outwardly from the crown portion 51 of the cover is preferably provided a generally radially and axially outwardly oblique annular intermediate portion 52 which, as shown, is of substantially frusto-conical shape and of a width which in assembly with the wheel will be accommodated freely within the customary groove-like annular space between the bulging body portion 12 of the wheel body 11 and the intermediate flange 32 of the tire rim. Radially outwardly bordering the intermediate portion 52 of the wheel cover is a generally convexly cross-sectioned annular, rib-like marginal portion 53 which extends generally radially and axially curvingly outwardly for substantially overlying the tire rim terminal flange clear of the juncture between the intermediate flange 32 and the terminal flange. The radially outward extent of the cover marginal portion 53 is preferably on a smaller diameter than the inside diameter of the rim terminal flange extremity so as to leave a gap therebetween, and the outer extremity of the cover marginal portion is preferably turned under into a reinforcing and rigidifying bead 54.

For retaining the cover 50 on the wheel in snap-on, pry-off relation the cover is provided with novel self-retaining means comprising an appropriate series of wing- or fin-like cover-retaining elements 55 preferably in the form of generally radially extending tabs carried at the axially inner side of the cover and preferably on the intermediate cover portion 52 for engagement with one of the wheel parts and preferably the tire rim. To this end, the retaining elements 55 are preferably formed as lugs or ears struck out from the intermediate cover portion 52 and bent toward the axially inner side of the cover along an integral juncture bend 57, in each instance. As best seen in Figures 11 and 13, the striking out of each of the retaining ears 55 leaves a corresponding opening 58 in the intermediate cover portion 52.

By preference, the retaining ears 55 are so constructed and arranged that when the cover 50 is fully assembled upon the wheel, the retaining ears will engage retainingly within the tire rim groove 31 behind a shoulder 59 defining the axially outer side of the groove. For this purpose, each of the retaining ears is provided with a generally radially outwardly projecting edge portion 60 which normally extends radially outwardly beyond the juncture of the intermediate cover portion 52 and the marginal cover portion 53 and to an initial or normal diameter greater than the diameter defined by the inner side of the intermediate flange 32 of the tire rim and more especially the portion thereof which defines the groove 31.

In order to facilitate application of the cover 50 to the wheel, and more particularly to provide for easy-on application of the cover, the retaining ears or wings 55 are preferably angled from true radial planes of the cover and are also disposed in respective planes angular to the axis of the cover. In a desirable arrangement, the retaining ears are provided in a uniform annular series with alternate ones of the ears divergently related, both radially outwardly and axially inwardly. Thus, the retaining ears 55 may be considered as in two sets of equal number disposed in alternating relation and with one set angled one way and the other set angled the other way. By preference, the retaining ears of the two sets are paired as shown with the radially inner portions of each pair of ears in adjacency but spaced apart.

By reason of the angled relationship of the retaining ears 55, and the inherent resiliency of the ears, especially at juncture with the cover body, the generally axially inwardly facing sides of the retaining ear edges 60 will respectively engage against the inner face of the tire rim intermediate flange 32 when the cover is initially placed in centered relation at the outer side of the wheel preparatory to being pushed home on the wheel. Then as the cover is pushed axially inwardly, the retaining ears 55 flex toward the back of the cover progressively, as indicated for example in Figures 15 and 17, to the extent necessary to accommodate the smaller and axially inwardly diminishing diameter of the tire rim intermediate flange 32. When the rim flange engaging edges 60 of the retaining ears have passed the shoulder 59 of the tire rim, the ears snap into the groove 31 and into retaining engagement behind the shoulder 59.

It will be observed that the rim-engaging portions of the respective retaining ear edges 60 are preferably of curvate profile which may be substantially conformable to the cross-sectional concavity of the groove 31, but in any event facilitates the sliding bearing engagement of the retaining edges during the cover press-on operation. The resiliency of the retaining ears 55 may be inherent in the material from which the cover 50 is made, such as a suitable grade of sheet metal, of which stainless steel has been found especially desirable in practice since it lends itself readily to a highly lustrous surface polishing. The approximate amount of flexing of the retaining ears from the normal position of the ears as shown in full outline in Figure 15 during application of the cover to the wheel is indicated in dash outline in Figure 15.

To enhance the resilient tension of the retaining ears 55 to work radially outwardly against the tire rim intermediate flange, the retaining ears are preferably generally radially elongated and with the rib-like junctures 57 thereof correspondingly elongated so that substantial resistance to transverse buckling of the ears is afforded. This assures a strong resilient tensioned gripping of the retaining ears against the tire rim.

By having the retaining ears 55 divergently angled radially outwardly, or what may be also termed toed out, they also function to hold the cover effectively against torque stresses tending to cause the cover to turn on the wheel in service. Thus, the retaining ears angled in one direction hold the cover against turning in that direction and the ears angled in the other direction hold the cover against turning in the opposite direction of rotation. This prevents distortion or covering over of a valve stem 61 (Figure 11) accommodated through one of the openings 61.

In order to cooperate with the radially outwardly projecting retaining edges 60 of the respective retaining ears 55 and to provide a stop arrangement for holding the cover in uniform spaced relation to the tire rim and also to the wheel body, the generally axially inwardly directed edges of the retaining ears are formed to engage against the side flange of the tire rim and at least the portion of the side flange at or adjacent to juncture thereof with the base flange of the tire rim. To this end the width of the retaining ears 55 is predetermined to engage the side flange of the tire rim immediately in advance of or at least properly cooperatively coinciding with the full snap-on of the retaining ears behind the tire rim shoulder 59 and the resilient return flexing of the ears from the flattening thereof as occurs during press-on (see Figures 15 and 17), to afford stressing and stop abutment against the tire rim side flange. Enhanced engagement of the shoulder 20 may be provided for by complementary profiling of the axially directed edges of the retaining ears as indicated at 62. The reaction of engagement of the ear edges 62 with the tire rim causes the retaining edges 60 to bear under resilient tension against the tire rim shoulder 59, and also assures that the cover will be supported in spaced relation to the tire rim and in non-rattling condition. This assures, also, that free circulation of cooling air between the wheel and the cover can occur in service. In addition, of course, the several openings 58 in the wheel cover provide in the aggregate substantial ventilation opening through the cover. The angularly disposed retaining ears 55 also serve as air circulation promoting vanes in the rotation of the cover.

By reason of the resilient nature of the retaining ears 55 they provide a cushioning mounting for the cover which affords a self-centering, substantially floating relation of the cover to the wheel, resiliently yieldably resisting curbing or other forces tending to dislodge the cover inadvertently or unintentionally.

When the cover 50 is to be pried from the wheel, a pry-off tool P (Figure 18) is introduced into the gap between the beaded edge 54 of the cover and the extremity flange of the tire rim. The tool P is then levered to exert the pry-off force to the cover. As a result, the portion of the cover to which the pry-off force is applied tends to tilt outwardly and at the same time due to the resilience of the retaining ears 55 and the generally floating manner in which they support the cover on the wheel, there is a generally radial movement of the cover responding to the generally radial component of initial pry-off force in addition to the axially outward component of force. When this occurs, the retaining ears 55 tend to resiliently move axially inwardly from the stressed retaining condition shown in Figure 12 and in full line in Figure 16 toward the untensioned, or off the wheel condition of the retaining ears substantially as indicated in dash outline in Figure 16 and also substantially shown in Figure 18. This flexing of the ears toward one another during pry-off causes the retaining edges 60 of the ears to enter more nearly toward, but not altogether into, square abutment with the tire rim shoulder 59 to thus substantially resist pry-off. This feature of the flexible retaining ears is of substantial value in resisting unintentional dislodgement of the cover since, as a matter of fact, any transverse or radial force against the cover such as the margin or the crown, which might tend to cause dislodgement of the retaining ears at the side of the cover from which the force is impressed will tend to enhance the gripping action thereof and thus resist popoff or dislodgement. The cover is thus endowed with a hardoff characteristic. However, by continued appropriate leverage by the pry-off tool, the retaining ears 55 will ride past the tire rim shoulder 59 and then slide out along the tire rim intermediate flange 32 to release the cover.

In the modification shown in Figure 19, a cover 65 is applied to a wheel in which the tire rim does not have a groove 31 or a shoulder 59 for interengagement with and by retaining ears on the cover.

In Figure 19, a wheel body 67 has an annular reinforcing nose bulge 68 and a peripheral attachment flange 69 which is attached to a base flange 70 of a tire rim 71. Inset areas 72 of the attachment flange 69 provide wheel openings 73 for air circulation through the wheel. Joining the base flange 70 of the tire rim is a side flange 74 having juncture with a generally axially and radially outwardly extending intermediate flange 75 to which in turn is joined a generally radially outwardly extending terminal flange 77 having an extremity flange portion 78. The tire rim supports a pneumatic tire and tube assembly 79.

The cover 65 comprises a crown portion 80 which has juncture at an intermediate annular generally axially inwardly directed rib 81 with an intermediate generally radially and axially outwardly angled annular substantially frusto-conical cover portion 82. The rib 81 is engageable with the radially outer side of the nose bulge 68 in the assembly of the cover with the wheel.

At the radially outer margin thereof, the cover 65 is provided with an annular rib-like convexly cross-sectioned margin 83 having the juncture thereof with the intermediate portion 82 of the cover on a reinforcing rib 84 which in the assembly lies adjacent to but spaced from the juncture between the tire rim flanges 75 and 77. As its outer extremity, the marginal portion 83 of the cover is formed with an underturned reinforcing and rigidifying bead 85. The outer diameter of the bead 85 is less than the inner diameter of the extremity flange 78 of the tire rim so that a gap persists between the bead and the extremity flange in the applied condition of the cover into which gap a pry-off tool can be inserted and through which gap, furthermore, air circulation can take place.

At appropriate intervals the intermediate portion 82 of the cover is provided with retaining wings, vanes, tabs, lugs or retaining ears 87 which may be struck out from the cover similarly as the retaining ears 55, previously described, and have juncture with the cover portion 82 on a reinforcing integral rib-like juncture bend 88. It will be understood that the retaining ears 87 may be provided in the same number as in the cover of Figure 11 and that the ears will be appropriately divergently angled both in radial direction and axial direction similarly as the retaining ears 55.

It will be observed that each of the retaining ears 87 is of substantially greater length than width and thereby is provided with substantial resilient resistance to buckling in transverse direction.

At the radially outer edge portion 89, each of the retaining ears 87 projects radially outwardly preferably beyond the juncture rib 84 and is retainingly engageable with the intermediate flange 75 of the cover.

In applying the cover 65 to the wheel, the cover is generally centered with respect to the wheel and with the rounded tire rim engaging edges 89 of the retaining ears 87 engaging against the shoulder at juncture of the intermediate flange and the terminal flange of the tire rim. Then the cover is pushed axially inwardly. This causes the retaining ears 87 to flex similarly as indicated in Figure 15 and slide inwardly along the tire rim intermediate flange 75. When the cover is bottomed with the rib 81 against the nose bulge 68 of the wheel, the retaining ears 87 are under maximum retaining stress acting uniformly radially outwardly in the series of ears against the tire rim intermediate flange 75 to retain the cover on the wheel.

Pry-off of the cover 65 is accomplished substantially the same as shown in connection with the cover 50 in Figure 18, and the reaction of the retaining ears 87 will be substantially the same as shown in Figure 16. The tendency of the retaining ear edges 89 to maintain retaining gripping engagement with the tire rim intermediate flange 75 during radial stresses against the cover assures against inadvertent pop-off of the cover.

It will be appreciated that the cover 80 will have openings 90 where the ears 87 are struck from the intermediate cover portion 82 and that such openings will afford ventilation through the cover in addition to the ventilation or air circulation that can take place between the cover and the tire rim as a result of the spaced relation of the radially outer portions of the cover from the tire rim. Furthermore, the retaining ears 87 act as vanes for promoting air circulation when the wheel is in rotation.

In the modification of Figure 14, a cover 91 is shown which is of generically the same character as the covers 50 and 65 described hereinabove but in this instance equipped to make retaining engagement with the terminal flange of the tire rim. The wheel includes a tire rim having an intermediate flange 92 and a terminal flange 93 including an extremity flange portion 94 defining a generally radially inwardly opening groove 95.

The cover 91 includes a body portion 97 which in assembly with the wheel lies in spaced relation to the wheel and has a marginal portion 98 provided with fin-like retaining ears 99 which in general structure and arrangement are much the same as the retaining fins or ears 55 and 87 hereinabove described.

By preference, each of the retaining ears 99 is struck out from the cover portion 98, thereby leaving an opening 100 and being joined integrally with the cover on a reinforcing juncture rib and bend line 101. The retaining ears 99 are generally radially elongated to afford substantial resilient stiffness and resist transverse buckling.

Each of the retaining ears 99 has a generally radially projecting retaining edge portion 102 that is generally complementary in shape to the shape of the terminal flange groove 95 so as to engage under resilient tension in the groove for retaining the cover on the wheel.

When the cover 91 is to be applied to the wheel, it is generally centered with regard to the outer side of the wheel and with the retaining ears 99 engaging against the tip of the extremity flange portion 94 of the tire rim. Then inward pressure is applied to the cover to cause the retaining ears 99 to flex and cam past the tip of the extremity flange of the tire rim and snap into the groove 95. It will be understood that the retaining ears 99 may be in substantially the relative angular disposition described for the retaining ears 55 so that on pressing the cover into position, the retaining ears 99 will go through approximately the same flexure sequence described in connection with Figures 15 and 17, while when the cover 91 is being pried from the wheel the retaining ears 99 will go through approximately the flexure sequence described in connection with Figures 16 and 18. In addition, due to the angular disposition of the retaining ears 99 they will thoroughly resist torque stresses tending to turn the cover 91 in either direction during service.

It should also be observed that the retaining ears 99 will act substantially as air circulation promoting vanes or fins in the rotation of the wheel, similarly as will the retaining ears or fins 55 and 87 of the cover described above.

At its radially outermost extremity, the cover 91 has its edge preferably turned under to provide a reinforcing and rigidifying bead 103.

In the form of Figures 20 through 25, a wheel cover 105 according to the present invention is adapted to be applied to the outer side of a vehicle wheel which is substantially the same as the wheel shown and described in connection with Figure 2 and accordingly similar reference numerals have been applied to the wheel elements.

The cover 105, while it may comprise a trim ring which covers only the tire rim and a portion of the wheel body adjacent the tire rim, in the present instance is in the form of a full disk which substantially covers the entire wheel including substantially all of the tire rim and all of the wheel body. To this end, the cover 105 comprises a central outwardly bulging crown portion 107 providing a chamber outwardly from the bolt-on flange 13 to accommodate a vehicle hub part that may project outwardly through the bolt-on flange. By preference the central crown portion 107 of the cover is of a diameter to extend toward the radially outer side of the nose bulge portion 12 of the wheel body 11 and has a generally axially intermediate cover part 109. The width of the intermediate cover part 109 is preferably somewhat less than the width of the groove defined between the tire rim intermediate flange 32 and the nose bulge 12 of the wheel body, and the intermediate cover portion 109 extends generally axially and radially outwardly in a substantially frusto-conical plane.

At its radially outer margin, the intermediate cover portion 109 joins on a generally axially inwardly extending rib-like juncture 110 with a convexly cross-sectioned marginal rib 111 that substantially overlies the tire rim terminal flange in the assembly. At its outer extremity the marginal rib 111 terminates in an underturned reinforcing and rigidifying bead 112. It will be observed that the outside diameter of the terminus of the cover as provided by the bead 111 is somewhat smaller than the inside diameter of the tip of the tire rim extremity flange portion so that an appreciable gap persists between the edge of the cover and the juncture rib 110 is of a diameter to be in spaced relation to the shoulder at juncture between the intermediate flange 32 and the tire rim terminal flange portion.

For retaining the cover 107 on the wheel, the cover is provided with novel self-retaining means on the axially inner side thereof and preferably carried by the intermediate cover portion 109. In the present instance, the retaining means comprise a uniform annular series of retaining flange structures 113 which are struck out from the intermediate cover portion 109 to extend generally axially inwardly and define openings 114 in the cover portion 109 as best seen in Figure 20.

Each of the retaining flange structures 113 preferably comprises an arcuate continuous flange having its opposite ends adjacent to the juncture rib 110 so that the flange is generally of concave curvature on its radially outer side and of convex curvature on its radially inner side. As best seen in Figures 22, 23 and 25, each of the retaining flange structures 113 comprises a narrow intermediate connecting flange portion 115 and a pair of end vane- or wing-like retaining ear lugs 117.

The retaining fins or ears 117 are of substantially greater width than the intermediate flange portion 115 and they project radially outwardly at their radially outer extremities beyond the juncture 110 to a diameter that is greater than the inside diameter of the tire rim intermediate flange 32 and more particularly the diameter defined at the inner side of the flange groove 31 behind a shoulder 118 at the axially outer side thereof. Moreover, each of the retaining ears 117 normally lies in divergent relation to the companion retaining ear at its base portion where it is a continuation of the connecting flange portion 115 at juncture with the wheel cover portion 109, but each of the retaining ears 117 is in generally toed in or convergent relative to its companion toward the tip of the ear. This relationship is best seen in Figure 23.

It will also be observed that the tip portion of each of the retaining ears 117 is rounded in profile substantially complementary to the groove 31 and provides a retaining edge portion 119 engageable in the groove behind the shoulder 118 in the assembled relation of the cover with the wheel. From Figure 21 it will be observed that the axial extent of each of the ears 117 is such that in the full assembly the axial portion of the retaining tip 119 will engage at the juncture portion of the side flange of the tire rim to hold the cover in fully spaced relation to the wheel, including both the wheel body and the tire rim.

The retaining ears 117 are of resilient characteristics derived from the inherent resiliency of the material such as sheet metal and more specifically, stainless steel, from which the cover may be made, or by suitably hardening the material of the ears after formation so that they will have adequate resilience to enable snap-on of the cover and pry-off.

For applying the cover to the wheel, the cover is placed in substantially centered relation on the wheel with the tips 119 of the retaining ears 117 engaging at the axially outer portion of the tire rim intermediate flange 32. Then inward force is applied to the cover and the retaining ears 117 resiliently flex toward one another, substantially as seen in full lines in Figures 24 and 25 and in dash lines in Figure 23, to deflect, not only toward one another, but radially inwardly progressively as the cover moves axially inwardly and the tips 119 of the retaining ears cam along the intermediate flange 32. As the tips 119 of the ears pass the shoulder 118, the ears snap into the groove 31 by expansion of the ears thereinto and the cover is drawn with snapping action the balance of the way into final assembly until the tips of the retaining ears engage into the axially innermost portion of the groove 31 to the maximum inward limit.

By reason of the continuous flange structure 115 of which each pair of the ears 117 is a part, and the fact that the radially outermost tips of the ears are of a larger normal diameter than the diameter defined by the groove 31, the ears are maintained under substantial resilient stress working radially outwardly against the surface defining the groove so that the ears thereby maintain the cover centered and resiliently floating on the wheel. In Figure 23, the stressed deflected condition of the ears while in the retaining relationship is shown in full outline. In Figure 25, the full line position of the retaining ears indicates the manner in which they are stressed in camming on the tire intermediate flange 32 until they snap behind the shoulder 118, while the dash outline positions of the retaining ears shows the normal position of the ears. In Figure 22 is shown the relationship of the retaining ears in the retaining relation thereof within the groove 31.

By reason of the fact that the retaining ears 117 engage the tire rim at an angle, which in each of the retaining ears is generally opposed to the angle of its companion, it will be clear that turning of the cover on the wheel will be effectually prevented, since one of the ears in each pair resists rotation in one direction while the companion ear resists rotation in the opposite direction.

When it is desired to pry the cover from the wheel, a pry-off tool, such as a screwdriver (not shown), is applied between the tire rim terminal flange and the beaded edge 112 of the cover and pry-off leverage applied to stress the adjacent retaining ears 117 from retaining engagement with the tire rim. The pry-off force will have not only a generally axially outward component, but also a generally radially inward component which will cause the cover to shift somewhat radially as permitted by the resilience of the retaining ears about its periphery and the nearest retaining ears will thereby be permitted to expand and thus straighten out somewhat and will continue to have substantial retaining effect behind the shoulder 22. Therefore, substantial pry-off force is required to dislodge the cover. This is a safeguard against accidental pop-off of the cover. Thus, the cover may be characterized as an easy-on, hard-off type of cover since the flexible retaining ears or vanes enable reasonably easy push-on of the cover, but quite substantial pry-off force is required to dislodge the cover. After the retaining fingers have been yieldably forced outwardly beyond the shoulder 118 during pry-off, it will be appreciated, of course, that the cover will readily pop off by resilient expansion of the fingers and outward camming thereof along the tire rim intermediate flange toward the unassembled condition of the cover.

The several openings 114 in the cover 105 afford large aggregate ventilation opening through the cover generally aligned with the wheel openings 14 so that quite free circulation of air through the cover is attained in service. In addition, the retaining ears 117 serve as air circulation promoting vanes or fins at the wheel openings to accelerate air circulation therethrough in the rotation of the wheel.

In all forms of cover described herein, the cover itself carries self-retaining means in the form of radially outwardly projecting ears or fins that engage edgewise with a portion of the wheel, at the tire rim, and retain the cover in resilient, substantially floating, self-centered relation permitting substantial flexing movements of the cover without popoff since the resilient retaining ears or fins will withstand substantial flexing while maintaining secure retaining engagement with the tire rim. It will be observed that in any form of the cover manufacturing variables and tolerances in the tire rim or the wheel body or in the relative disposition of either will be easily accommodated by the cover which will adapt itself readily to the particular wheel to which it may be applied interchangeably.

The several covers are further characterized by generally spoke-simulating portions disposed between radially inner and outer divergent cover portions and connecting the several cover retaining and air circulation promoting wing- or vane-like elements to the cover.

It will be understood that modifications and variations may be effected without departing from the scope of the novel concepts of the present invention.

I claim as my invention:

1. In a wheel structure ncluding a wheel part having an annular shoulder comprising a flange, a wheel cover having connected thereto and projected from a concealed and rear side thereof divergent resiliently flexible wings terminating in edges for detachable gripping engagement with the wheel flange and being movable apart upon initial engagement with said flange and movable toward each other thereafter to engage the flange and resiliently resist displacement from engagement with the wheel flange, said cover comprising divergent portions with said divergent wings connected by a spoke-simulating portion on the outer side of the cover and disposed between said divergent cover portions.

2. In a vehicle wheel structure including a multi-flanged tire rim, a cover for the outer side of the wheel including fin-like retaining elements therebehind having generally radially extending body portions with generally radially elongated margins connected to the cover and radially outer generally axially extending free edges having axially inner parts thereof projecting radially outwardly substantially beyond adjacent axially outer parts of said edges for retainingly engaging with a flange of the tire rim, said retaining elements being angled relative to one another in a uniform series and thus engaging the tire rim flange in a manner to effectively resist torque forces tending to turn the cover on the wheel in service.

3. In a wheel structure including a tire rim and a wheel body affording air circulation openings through the wheel and defining with the tire rim an annular groove of substantial width with which said openings communicate, a member for covering said groove and having a radially inner portion closely disposable in relation to the wheel body radially inwardly from said openings to substantially preclude movement of air from said groove to the radially inner portion of the wheel body, said covering member having a radially outer portion for spaced disposition relative to the tire rim, and a series of axially inwardly extending air circulation promoting fin vanes on said member disposed in respective planes extending generally axially and radially so that if projected such planes would intersect the cover periphery both axially and radially, and said fin vane planes being oblique to tangents to the circumferential points at which said intersection would take place so as to have efficient air motivating effect in the rotation of the member with the wheel, said fin vanes having axially inner and radial edges thereof disposed close to the wheel body and the flanges of the tire rim for thereby subdividing the annular space in said groove behind said covering member into a plurality of compartments with which said wheel openings communicate and which are substantially isolated from one another but have openings generally radially and axially outwardly between the radially outer extremity portion of the covering member and the radially outer portion of the tire rim.

4. In a wheel structure including a wheel part having an annular shoulder comprising a flange, a wheel cover having connected thereto divergent resiliently flexible wings terminating in edges for detachable gripping engagement with the wheel flange and being movable apart upon initial engagement with said flange and movable toward each other thereafter to engage the flange and resiliently resist displacement from engagement with the wheel flange, said divergent wings being connected by a spoke-simulating portion on the outer side of the cover.

5. In a wheel structure including a circular generally radially facing surface, a cover for disposition at the axially outer side of the wheel and having a circular portion facing generally radially toward said circular radially facing wheel portion, said cover portion carrying attached thereto wing-like cover retaining resilient flange members disposed in planes oblique to the axis of the cover and the wheel and extending generally axially and radially to a normally slightly different diameter than said radially facing wheel portion so as to be in engagement therewith under resilient tension so that generally radially extending edges on said wing-like flange members engage in retaining gripping relation against said wheel portion, said wing-like flange members having, at the connections thereof with the cover, portions that face toward the inner face of the cover portion and are backed up theretoward to implement the resilient tensioning of said wing-like flange members incident to the radial deflection of the wing-like flange member edges in retaining engagement with said wheel portion.

6. In a wheel structure including a multi-flange tire rim and a wheel body supporting the tire rim, a circular wheel cover for disposition over the outer side of the wheel, provided with a radially outer portion for overlying the tire rim, and having means for retaining the cover in predetermined position on the wheel against both axial and circumferential displacement, said means including a circumferential series of portions behind the radially outer cover portion provided with substantially sharp cut edges angled generally toward the tire rim for engagement of substantially radially outwardly offset retaining portions of the edges in tensioned biting gripping relation with an opposing surface of the tire rim, certain of said sharp edges being directed generally in one circumferential direction and others of the sharp edges being directed generally in the opposite circumferential direction so as to retain the cover against torque-induced turning displacement in either rotary direction of revolution of the wheel in service.

7. In a wheel structure including a wheel having a body and a multi-flanged rim including an intermediate generally axially inclined flange, a circular wheel cover including an outer annular portion having rearwardly projecting therefrom a plurality of divergent elements spaced in circular manner around the wheel axis, each with a radially outer edge portion for engaging said intermediate rim flange and for resisting turning of the cover on the wheel, said divergent elements converging in a direction axially outward of the cover and being cammingly movable apart in a circumferential direction upon engagement with said rim flange, each of said elements also having an axial rearward portion for bottoming against the wheel to limit inward axial movement of the cover on the wheel.

(References on following page)

References Cited in the file of this patent

UNITED STATES PATENTS

| | | |
|---|---|---|
| Re. 22,042 | Lyon | Mar. 3, 1942 |
| 1,889,070 | Hyatt | Nov. 29, 1932 |
| 2,115,182 | Sinclair | Apr. 26, 1938 |
| 2,148,211 | Lyon | Feb. 21, 1939 |
| 2,276,405 | Lyon | Mar. 17, 1942 |
| 2,368,228 | Lyon | Jan. 30, 1945 |
| 2,595,873 | Mulhern | May 6, 1952 |
| 2,785,777 | Horn | Mar. 19, 1957 |

OTHER REFERENCES

Brake Service, vol. 21, No. 5, May 1951, page 14.